(12) United States Patent
Mickeleit

(10) Patent No.: US 9,275,362 B2
(45) Date of Patent: Mar. 1, 2016

(54) METHOD AND SYSTEM FOR HANDLING FILES WITH MOBILE TERMINALS AND A CORRESPONDING COMPUTER PROGRAM AND A CORRESPONDING COMPUTER-READABLE STORAGE MEDIUM

(75) Inventor: Carsten Mickeleit, Berlin (DE)

(73) Assignee: Cortado AG, Berlin (DE)

( * ) Notice: Subject to any disclaimer, the term of this patent is extended or adjusted under 35 U.S.C. 154(b) by 1667 days.

(21) Appl. No.: 11/468,027

(22) Filed: Aug. 29, 2006

(65) Prior Publication Data
US 2007/0049302 A1  Mar. 1, 2007

(30) Foreign Application Priority Data

Aug. 30, 2005 (DE) .......................... 10 2005 042 068
Sep. 26, 2005 (DE) .......................... 10 2005 046 079

(51) Int. Cl.
*H04M 1/725* (2006.01)
*G06Q 10/10* (2012.01)

(52) U.S. Cl.
CPC ...................................... *G06Q 10/10* (2013.01)

(58) Field of Classification Search
CPC .... G06Q 10/10; G06Q 10/107; G06F 3/1292; H04W 8/20
See application file for complete search history.

(56) References Cited

U.S. PATENT DOCUMENTS

| 7,275,116 | B1 * | 9/2007 | Hanmann et al. | ............. 709/250 |
| 7,454,789 | B2 * | 11/2008 | Braverman et al. | ............. 726/22 |
| 7,536,440 | B2 * | 5/2009 | Budd et al. | ..................... 709/206 |
| 2003/0051054 | A1 * | 3/2003 | Redlich et al. | ................ 709/246 |
| 2003/0067624 | A1 * | 4/2003 | Anderson et al. | ............ 358/1.15 |
| 2003/0149935 | A1 | 8/2003 | Takizawa et al. | |
| 2004/0203947 | A1 | 10/2004 | Moles | |

(Continued)

FOREIGN PATENT DOCUMENTS

EP   1367514 A1   12/2003
EP   1406458 A1   4/2004

(Continued)

OTHER PUBLICATIONS

Gievers, Rainer, "Das Praxisbuch Zum Siemens SX1"; Der schnelle Einstieg; 2004, pp. 1, 3, 11, 12, 184, 185, 206, 210, Germany.

(Continued)

*Primary Examiner* — Ajit Patel
(74) *Attorney, Agent, or Firm* — Norris McLaughlin & Marcus, P.A.

(57) ABSTRACT

A method and system for handling files with mobile terminals and a corresponding computer program and a corresponding computer-readable storage medium, which can be used in particular for handling e-mail attachments and the like on mobile terminals (PDAs, Smartphone, mobile phone) are described. According to the described method, an original file is stored on a data processing device different from the mobile terminal, and a file corresponding to the original file is generated and transmitted to the mobile terminal. The corresponding file includes information about the storage location of the original file. The original file is handled on the data processing device. An application installed on the mobile terminal processes at least part of the data in the corresponding file according to user input entered on the mobile terminal. First processing device is thereby prompted to execute handling of the original file according to the user input.

80 Claims, 2 Drawing Sheets

(56) References Cited

U.S. PATENT DOCUMENTS

| | | |
|---|---|---|
| 2005/0076085 A1* | 4/2005 | Budd et al. ............... 709/206 |
| 2005/0198179 A1* | 9/2005 | Savilampi ................ 709/206 |
| 2005/0223074 A1* | 10/2005 | Morris ............ G06Q 10/107 |
| | | 709/207 |
| 2006/0031309 A1* | 2/2006 | Luoffo et al. ............. 709/206 |
| 2006/0168012 A1* | 7/2006 | Rose et al. ............... 709/206 |
| 2006/0218234 A1* | 9/2006 | Deng et al. ............... 709/206 |
| 2007/0016636 A1* | 1/2007 | Boerries et al. ........... 709/200 |
| 2008/0189373 A1* | 8/2008 | Ikonen et al. ............. 709/206 |

FOREIGN PATENT DOCUMENTS

| | | |
|---|---|---|
| JP | H08129516 A | 5/1996 |
| JP | H11134265 A | 5/1999 |
| JP | 2001306471 A | 11/2002 |
| JP | 2003281128 A | 10/2003 |
| JP | 2004153383 A | 5/2004 |
| JP | 2006-185441 A | 12/2004 |
| JP | 2005031781 A | 2/2005 |
| JP | 2005222376 A | 8/2005 |
| JP | 2006-181904 A | 7/2006 |
| WO | 2004112296 A2 | 12/2004 |
| WO | 2005013544 A1 | 2/2005 |

OTHER PUBLICATIONS

"Digital Cellular Telecommunications System (Phase 2+) (GSM); Universal Mobile Telecommunications Systems (UMTS); Multimedia Messaging Service (MMS); Functional Description; Stage 2"; Global System for Mobile Communications; Mar. 2002; pp. 1-119; 3GPP TS 23.140 version 5.2.0 Release 5, European Telecommunications Standards Institute; Sophia Antipolis Cedex, France.

* cited by examiner

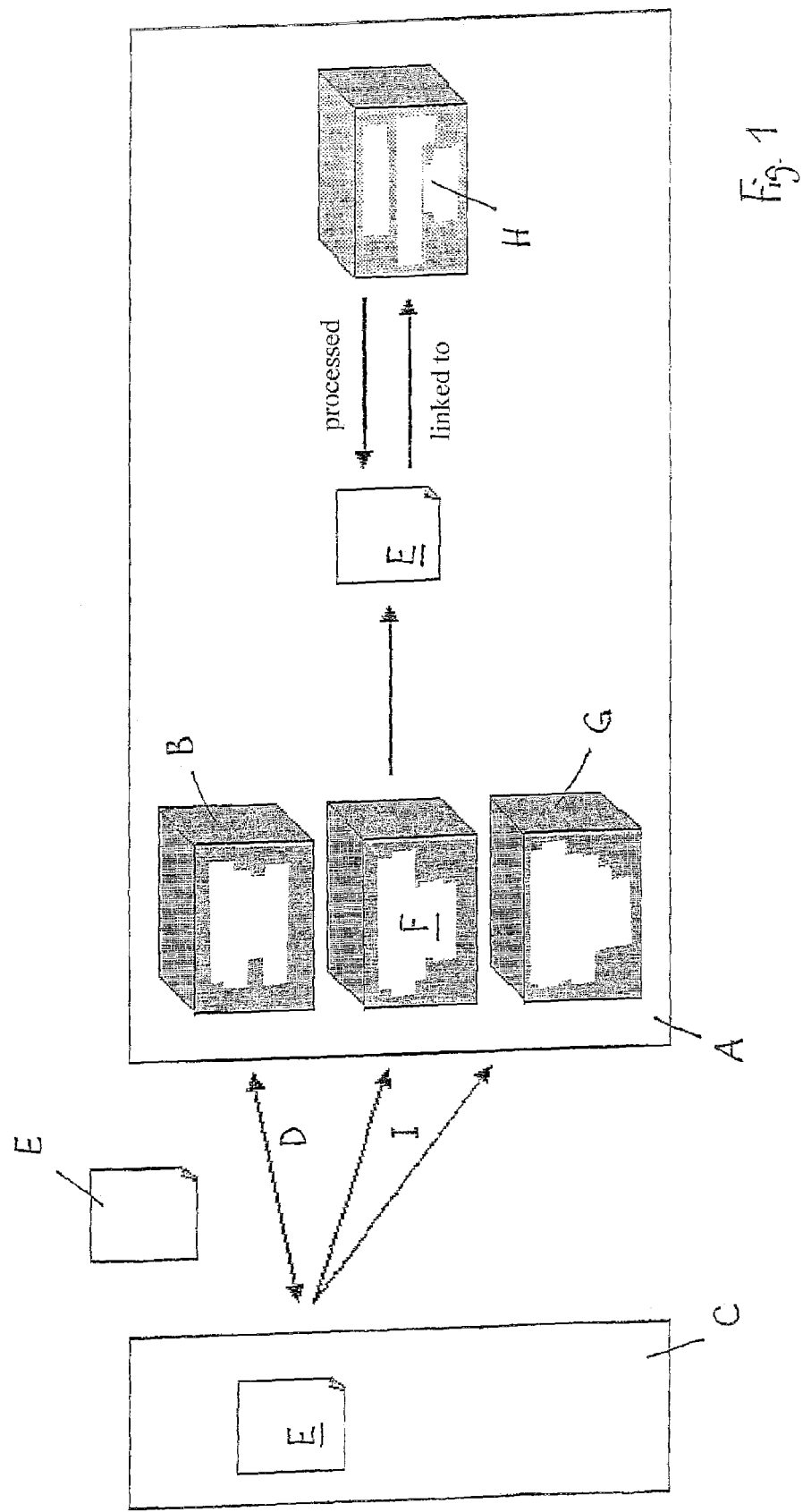

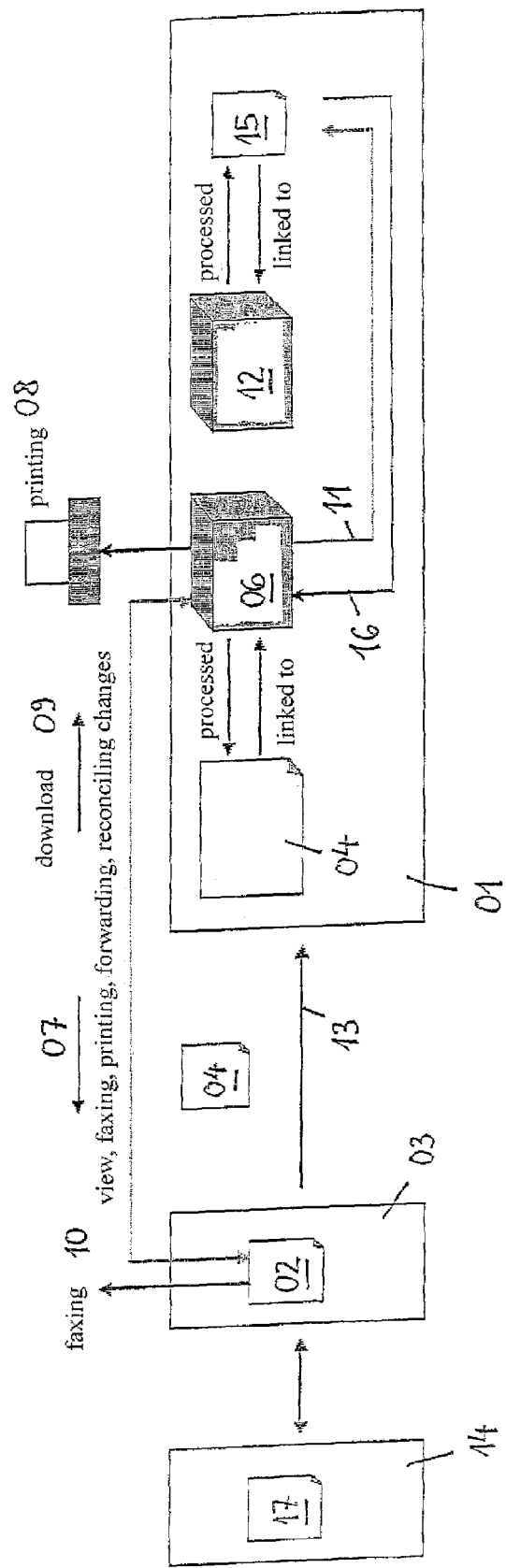

METHOD AND SYSTEM FOR HANDLING FILES WITH MOBILE TERMINALS AND A CORRESPONDING COMPUTER PROGRAM AND A CORRESPONDING COMPUTER-READABLE STORAGE MEDIUM

FIELD OF THE INVENTION

The present invention relates to a method and system for handling files with mobile terminals and a corresponding computer program and a corresponding computer-readable storage medium, which can be used in particular for handling e-mail attachments and the like on mobile terminals, such as a Personal Digital Assistant (PDA), a Smartphone or a mobile telephone.

BACKGROUND OF THE INVENTION

Presently, e-mails are customary received together with attachments on mobile terminals. The following methods represent the state-of-the-art (the letters refer to FIG. 1):

A WAP or Web-based mail system C is accessed D by a mobile terminal A with the help of a browser B. Other methods are also known where e-mail attachments E are displayed in HTML format (e.g., Nokia Business One Server). This method has the advantage of being platform-independent, but has the significant disadvantage that the operation is not acceptable to a user.

Another method (Blackberry, Research In Motion Limited) uses special software G installed on the mobile terminal A or special mobile terminals which enable reception of e-mails; e-mail attachments E in the form of Text or HTML pages can also be viewed in this case. This method has the disadvantage that either special devices must be used or software G which is a different from standard mail agents F must be employed for receiving e-mails and attachments E.

Finally, standard mail agents F are used which are preinstalled on the terminals A. These agents F typically enable downloading I of attachments E in their original form. However, attachments must disadvantageously always be transmitted in their entirety and can only be viewed by using the applications H installed on the mobile terminal.

All these methods have in common of that complicated operations such as printing and faxing of the attachments E is typically not possible at all or are severely limited.

It would therefore be desirable to provide a method and a system for handling files with mobile terminals and a corresponding computer program and a corresponding computer-readable storage medium, which obviate the disadvantages of conventional systems and methods and, more particularly, make it possible to separately process file attachments of e-mails.

SUMMARY OF THE INVENTION

With the systems and methods of the invention, a standard mail agent of the mobile terminal can be used without integration or interface requirements. This ensures, which is very important, on one hand, user acceptance through systematic integration into the terminal (flashing upon arrival of new e-mail, short keys to the mailbox, etc.) and, on the other hand, also enables the use of the standards and upgrades of the respective mail agents (Exchange Push-Mail) at any time. The invention also enables the user to utilize additional ancillary programs based on the standard mail agent.

The method of the invention for handling files with mobile terminals has the particular advantage that, for example, even e-mail attachments can be handled and displayed independent of their file format on a mobile terminal, such as for example a personal Digital assistant (PDA), a Smartphone, a mobile telephone or similar terminals. With the invention, it becomes also unnecessary to install the corresponding application for each file format on the mobile terminal. This is achieved by storing an original file to be handled on a first data processing device different from the mobile terminal, generating a file corresponding to the original file and transmitting the corresponding file to the mobile terminal, wherein the corresponding file includes at least information about the storage location of the original file. On the mobile terminal an application is installed, and at least a portion of data contained in the corresponding file is processed by the installed application according to user input entered on the mobile terminal. The first or a second data processing device which is different from the mobile terminal is then prompted to execute handling of the original file according to the user input. It is particularly advantageous if the corresponding file has a smaller file size than the original file and/or has a format optimized for the mobile terminal. The transmission time of the files to the mobile terminal can then be shortened in view of the often limited transmission rate, and display and/or processing of the corresponding file can be simplified. The corresponding file is preferably in HTML format.

In a preferred embodiment of the method of the invention, the corresponding files are transmitted from the data processing device to the mobile terminal by using a telecommunication service or by using a TCP/IP, HTTP, HTTPS, FTP, SFTP, Telnet or SSH connection, or by using other protocols employed for data transmission in data and/or communication networks. The telecommunication service can be implemented, for example, as a Short Message Service (SMS), an Enhanced Messaging System (EMS), or a Multimedia Messaging Service (MMS).

Preferably, the method of the invention can be employed to process attached files transmitted by communication services, such as for example e-mail, SMS or MMS (together with the actual message [body]). The original file transmitted from a terminal to the server of a provider of an e-mail or telecommunication service as e-mail, SMS, EMS or MMS attachment, is subsequently replaced by the corresponding file, whereafter the corresponding file is transmitted to the mobile terminal instead of the original file as e-mail, SMS, EMS or MMS attachment.

For this purpose, for example, original files are transmitted from the server of a provider of an e-mail or telecommunication service to the first data processing device which is different from the mobile terminal, whereafter the original attachment is replaced by the corresponding file, and the corresponding file is transmitted to the mobile terminal instead of the original file in form of an e-mail, SMS, EMS or MMS attachment. In a preferred embodiment of the method of the invention, the corresponding file is generated by transmitting the corresponding original files from the server of the provider of the e-mail or telecommunication service to the first data processing device, which is different from the mobile terminal, where the corresponding file is then generated. The first data processing device which is different from the mobile terminal functions with respect to the mobile terminal as a server of a provider of an e-mail or telecommunication service, wherein a computer program is installed on the first data processing device which is different from the mobile terminal. The computer program queries the server of a provider of the e-mail or telecommunication service for e-mails or messages resident on the server, accepts the existing e-mails or messages, optionally replaces the original files with corresponding files, and makes the corresponding files available on the mobile terminal. In a preferred embodiment, the e-mail attachments are transmitted by a mail server over a data network, for example a local area network (LAN) and/or the Internet, to another data processing device, where a computer program is installed which generates the file corresponding to the e-mail attachment. Advantageously, the mail server and the computer program which generates the corresponding file can be installed on the same data processing device.

The method of the invention for handling files with mobile terminals can also be employed when the file to be outputted and/or processed is already resident on the mobile terminal, but cannot be displayed or processed, for example, because the corresponding application program is not installed on the mobile terminal. In this case, according to the invention, original files are transmitted from the mobile terminal to the first or second data processing device which is different from the mobile terminal, where the corresponding file is generated and subsequently transmitted to the mobile terminal. When the corresponding file is generated, the format is converted into a format that can be outputted and/or processed on the mobile terminal. Advantageously, the corresponding file can also include data which make it possible to reproduce the content of the original file on the mobile terminal so as to be essentially corresponding to the original.

In a preferred embodiment of the invention, the original file is generated with the help of a Digital Pen (digitizing pen) and sent to the mobile terminal. The original file can be transmitted over the air or by wire using Bluetooth, infrared, wireless LAN.

Advantageously, the transmission of the original file to the first or second data processing device which is different from the mobile terminal, is controlled by the application installed on the mobile terminal.

In a preferred embodiment of the method of the invention, the corresponding files can be processed on the mobile terminal. The corresponding files with data which enable the content of the original file to be reproduced on the mobile terminal so as to be essentially identical to the original, are thereby modified on the mobile terminal and subsequently transmitted to the first or second data processing device which is different from the mobile terminal. The original file is then changed to reflect the modifications made on the terminal. To determine if an original file or a corresponding file was modified, the changes to the original file or to the corresponding file can advantageously be determined by detecting certain values. The value to be detected is preferably a hash value, a serial number or a timestamp.

According to another preferred embodiment of the method of the invention for handling files with mobile terminals, the application installed on the mobile terminal is started by calling the corresponding file the via a link. The application is advantageously installed on the mobile terminal as a client program. Preferably, at least a portion of the client program is integrated in a standard program for mail, file or calendar administration residing on the mobile terminal. In a preferred embodiment, the client program is automatically embedded in the standard program installed on the mobile terminal. Advantageously, the menu bar of the standard program(s) can be enhanced, for example, by adding the corresponding "handling" buttons (print, download, forward, translation buttons and the like), thus allowing the user to invoke the handling functions by simply clicking on these buttons. The corresponding file can then be started from the standard programs with which the user is familiar (such as the standard programs for mail, file or calendar administration), for example by a (double-) mouse click. The application connected with the file type of the corresponding file may enable a number of operations of the corresponding file and/or the original file. Preferably, the operations include visual output of the original file on the mobile terminal,
processing a print order for printing the original file,
downloading the original file to the mobile terminal,
forwarding the original file as e-mail, fax, SMS, MMS,
storing the original file on a server, and/or
language translation of the original file,
text recognition and conversion to a corresponding text document,
evaluation of the document generated with a digitizing pen with a subsequent summary of information, and/or
evaluation of the document generated with a digitizing pen through a subsequent automatic start of additional processes.

These processes to be started may more particularly include workflows, such as purchasing processes, acceptance processes and the like.

An advantageous application of the invention includes, for example, the return of a rental car. When the rental car is accepted, the employee of the rental car company notes the fuel level, the license plate number and any existing damage. With the described operations, (s)he can now initiate:

printing of a 1:1 copy of the notes,
printing of an acceptance protocol in typescript,
printing of a corresponding invoice, and/or
the process (workflow) relating to claims settlement in the event of damage.

The employee simply uses a digitizing pen, writes the note by hand, sends the note from the digitizing pen to the mobile phone and selects the desired operation via the mobile phone menu.

Advantageously, print output of the original file is performed via the mobile terminal or via a first or second data processing device which is different from the mobile terminal.

According to another advantageous embodiment of the invention, a results log of the handling is provided to the mobile terminal and/or the content of the corresponding file and/or of the results log is directly inserted in an application residing on the mobile terminal, e.g., a new e-mail, a new calendar entry and the like. The results log can be transmitted to the mobile terminal in addition to the corresponding file or instead of the corresponding file.

Print output can be provided through the mobile terminal or via the data processing device which is different from the mobile terminal.

In another preferred embodiment of the method of the invention for handling files with mobile terminals, handling includes the following: the content of the original file is stored in a file on the mobile terminal, with the type of the file stored on the mobile terminal corresponding to the file type of the original file or being comparable to the file type of the original file.

According to yet another preferred embodiment of the method of the invention for handling files with mobile terminals, the corresponding file is called from a mail application,
a calendar application, or
a file directory application.

In a preferred embodiment of the method of the invention, files are transmitted to the mobile terminal by e-mail, SMS, MMS or as a download. The files can include original files and/or corresponding files. The files are preferably transmitted to the mobile terminal over a wireless connection suitable for data exchange.

A system according to the invention includes at least a chip and/or processor configured to execute a method for handling files with mobile terminals, wherein an original file to be handled is stored on a first data processing device different from the mobile terminal, a file corresponding to the original file is generated and transmitted to the mobile terminal, wherein the corresponding file includes at least information about the storage location of the original file. On the mobile terminal an application is installed, and at least a portion of data contained in the corresponding file is processed by the installed application according to user input entered on the mobile terminal. The first or a second data processing device which is different from the mobile terminal is then prompted to execute handling of the original file according to the user input. Communication and data transmission between the mobile terminal and the data processing device(s) occur preferably over wireless data and/or communication links.

A computer program is used for performing the method of the invention. A computer program according to the invention for handling files with mobile terminals includes program modules on the client side and the server side and enables a data processing device, after the client-side program module(s) is/are loaded into memory of the mobile terminal and the server-side program module(s) is/are loaded into the memory of the data processing device, to execute in cooperation with a mobile terminal a method for handling data with mobile terminals, wherein an original file to be handled is stored on a first data processing device different from the mobile terminal, a file corresponding to the original file is generated and transmitted to the mobile terminal, wherein the corresponding file includes at least information about the storage location of the original file. On the mobile terminal an application is installed, and at least a portion of data contained in the corresponding file is processed by the installed application according to user input entered on the mobile terminal. The first or a second data processing device which is different from the mobile terminal is prompted to execute handling of the original file according to the user input.

For example, these computer programs can be provided for downloading in a data or communication network (either fee-based or free of charge, freely accessible or password-protected). The downloaded computer programs can be downloaded from an electronic data network, for example from the Internet, to a data processing device connected to the data network, and utilized with any of the aforedescribed methods. The computer program according to the invention is advantageously distributed on a computer-readable storage medium storing a computer program, wherein the computer program comprises client-side and server-side program modules and the computer program enables a data processing device in cooperation with a mobile terminal, after the client-side program module(s) is/are loaded into memory of the mobile terminal and the server-side program module(s) is/are loaded into the memory of the data processing device, to execute a method for handling data with mobile terminals, wherein an original file to be handled is stored on a first data processing device different from the mobile terminal, and a file corresponding to the original file is generated and transmitted to the mobile terminal. The corresponding file includes at least information about the storage location of the original file. On the mobile terminal an application is installed, and at least a portion of data contained in the corresponding file is processed by the installed application according to user input entered on the mobile terminal. The first or a second data processing device which is different from the mobile terminal is prompted to execute handling of the original file according to the user input.

The described method of the invention makes it possible to process attachments adapted to mobile computing even when using the standard mail agents of the mobile terminal.

According to additional advantages of the method of the invention, the original files are not transmitted to the mobile terminal, but are available on the server of the service provider for outputting and additional processing, the corresponding file has typically a smaller data size (approximately 10 to 15 kB) than the original file, except for the second program module installed on the mobile terminal and a standard program for mail administration (standard mail agents), no additional programs, such as a browser, are required for opening or editing e-mail attachments.

The present invention therefore optimizes handling for the user by using standard mail agents, without requiring integration from the mail agent. With the invention, attachments can be viewed without downloading and simultaneously comprehensively processed, for example, to facilitate printing and faxing, etc. Advantageously, no file-specific applications are required of the mobile terminal.

BRIEF DESCRIPTION OF THE DRAWINGS

An exemplary embodiment of the invention will be described below with reference to the appended drawing.

FIG. 1 shows a schematic diagram of conventional handling of a file by a mobile terminal, FIG. 2 shows an exemplary diagram of handling of a file by a mobile terminal according to the invention.

DETAILED DESCRIPTION OF CERTAIN ILLUSTRATED EMBODIMENTS

The invention will now be described with reference to an example for processing e-mail attachments. It should be noted that the invention is not limited to the exemplary embodiment described below, but that the method and system can also be used for handling attachments of other message services in communication systems, such as for example SMS or MMS attachments. Likewise, files may also be processed in the manner according to the invention by accessing files via the mobile terminal 01 remotely over communication links of a network, and by downloading 13 to the mobile terminal 01 instead of the original file 02 a file 04 corresponding to the original file and processing the corresponding file 04. After the processed corresponding file 04 is returned, it is automatically compared with the original file 02 and the original file 02 is updated as necessary.

FIG. 1 shows a schematic diagram of conventional handling of an original file, for example an e-mail attachment E, by a mobile terminal A. With conventional solutions, when a user received, for example, an e-mail with a file attachment, e.g., an Excel file attached to the e-mail, the user was notified when querying his/her mailbox located on the server C of the e-mail provider. To output or process the Excel file, i.e., the original e-mail attachment E, the user was until now required to download the e-mail attachment E from the server C. Downloading large original files poses a problem with certain communication links. Another problem is often that the application H associated with the format of the e-mail attachment E must be installed on the mobile terminal A, so as to be able to view and/or process of the original e-mail attachment E.

However, this is frequently not the case with many mobile terminals A due to limited resources.

Conversely, the underlying principle of the method of the invention can be described as follows (see FIG. 2): A corresponding file 04 is generated for original files 02 which are present in conventional formats, such as office, PDF or other types of documents capable of printing text or graphics (such as print orders). Original files 02 to be handled are in particular document files, whereby document files are designed to include those files which can be opened, stored and/or changed by applications, i.e., those files which are documents of the respective application—as opposed to, for example, system files and application files (exe-files). The corresponding files 04 are generated by a computer program which is maintained, for example, on a special server 03 of a provider of this service. The corresponding files 04 represent a special dedicated file format which can be visualized on the mobile terminal 01 with the help of a special application 06 installed on the mobile terminal 01 and which, in a preferred embodiment, can also be edited on the mobile terminal 01. Editing can include, for example, changing or updating a text or appending an image. In addition, this special dedicated file format cannot only be generated by the aforementioned computer program, but can also be handled and further processed. Handling and further processing may include, in particular, merging a revised corresponding file 04 processed on the mobile terminal 01 with the original file 02 by a computer program installed on the server 03 of the service provider. Changes performed of the mobile terminal 01 are then incorporated in the original file 02.

For example, instead of the actual original file 02, e.g., a Microsoft Excel table, a corresponding file 04 can be generated which merely includes a link 05 to the Excel file. This corresponding file 04 can now be downloaded 13 to the mobile terminal 01 in form of an attachment to an e-mail. The e-mail is then called on the mobile terminal 01 with the aforementioned special application 06, which enables handling of the original file 02, for example printing 08, sending 10 of faxes, downloading 09 of the original file 02, displaying the content of the original file 02 and much more, based on the links 05 included in the e-mail attachment. The commands for handling the original file 02, optionally with additional data of, for example a processed corresponding file 04, are hereby transmitted 07 by the special application 06 to the server 03 of the service provider, which starts sending 10 faxes, printing or downloading 09. In a preferred embodiment, the print orders may be started on the server 03 of the service provider, whereas the print output 08 of the original file 02 can be performed either through the server 03 of the service provider or the mobile terminal 01.

In an exemplary embodiment of the invention, two different modalities of the corresponding file 04 exist:

The corresponding file 04 includes only a link 05 which enables a user to print 08 or preview the original file 02. According to an exemplary application of this situation, the user could, when calling his/her mailbox, have all attachments replaced by corresponding files 04, which only include the link 05 to the corresponding original file 02. When reading the mail on the mobile terminal 01, the preview or the print is generated by clicking on the corresponding file 04, whereby the original file 02 residing on a server 03 of the provider is accessed via the link 05 in the corresponding file 04 and the corresponding application (e.g., a print order) is simultaneously started on the server 03 of the provider. The mail download is therefore very fast, the original files 02 of the original attachments are stored on a server 03 of the provider in a personal storage area of the user.

The corresponding file 04 includes link 05 and preview data: the user is provided with all possibilities which (s)he can already use with a corresponding file 04 that only includes the link 05 to the original file 02. In addition, the user can also change the preview on the mobile device 01 and send 07 the changed version to the server 03 of the provider where the changes are then incorporated in the original file 02.

The special file format of the corresponding files 04 in conjunction with the client-side program module, i.e., with the special application 06 installed on the mobile terminal 01, provides specifically the following functions (alternatively or in combination):

- a (persistent) preview of the original document 02 which preserves the format. The preview can consist of a summary (i.e., text and image "preview") tailored to the mobile terminal 01, which can be displayed directly on the mobile terminal 01 (since original file 02 can generally not be directly displayed and are frequently also too large),
- a link 05 (e.g., a Unified Resource Location, URL) to the original file 02,
- the possibility to call different functions, for example initiating a print order 08, forwarding the original file 02 as mail, fax 10, SMS, MMS,
- identification of changes in the corresponding files 04 and updating the original file 02 to incorporate the changes performed in the corresponding file 04 (so-called Revision Tracking).

In one embodiment, the corresponding file 04 includes HTML code, optionally images and/or style sheets (with information for formatting the corresponding file 04 for output on the mobile terminal 01), so that a faithful or an essentially faithful representation of the original document 02 on the mobile terminal 01 is outputted. In addition, each corresponding file 04 includes the name of the server 03 of the service provider. In one embodiment of the invention, external links within the HTML code included in the corresponding file 04 are only permitted if these links are directed to the server 03 of the service provider.

As mentioned above, client software is installed on the mobile terminal 01, i.e., a special application 06 which is linked to the special file format of the corresponding file 04. To utilize the aforementioned different functions, the corresponding file 04 includes a link 05 or a sequence of links 05 to the server 03 of the provider of these services and/or functions. To allow the user of the mobile terminal 01 to log into this server 03, the corresponding file 04 includes (preferably encrypted) access data of the user. These can be used, for example, to use POP3 functionality, which is performed according to the invention, for example, as follows:

the mail server 14 of the user is not queried directly from the mobile terminal 01, but indirectly in that the special application 06 (client software) associated with the file format of the corresponding file 04 sends 07 the corresponding command for handling the original file 02, i.e., the user's query to the server 03 of the service provider. The server 03 of the service provider in turn queries the mail server 14, the e-mails received by the mail server 14 are called and stored in a special area on the server 03 of the service provider provided for the user. When querying the mail account 17, the server 03 of the service provider appears to the mail server 14 as a mobile terminal (user), whereas the server 03 of the service provider appears to the mobile terminal as a mail server. The original files 02 of the original e-mail attachments are exchanged on the server 03 of the service provider against the corresponding files 04, which include a link 05 to the original file 02 of the original attachments. The e-mails, now with the corresponding files 04 as attachment, are then transmitted to the mobile terminal 01. When such attachment is selected, for example by a double-click, the special application 06 (client software) associated with the file format of the corresponding file 04 is started. After the start of the special application 06, a numerous functions are available to the user. For example, the user can display the corresponding file 04 on the mobile terminal 01, the user can start a print order 08 of the original document 02 on the provider server 03, or the user can start on the provider server 03 a program which forwards the original file 02 as mail, fax 10, SMS or MMS or stores the original file 02 on a server. A program installed on the provider server 03 hereby accesses the original files 02 stored on the provider server 03 and executes the corresponding functions. Since the provider server 03 has all the information to access the original data, there is no longer in need to download the original data 02 to the mobile terminal 01.

Preferably, the corresponding files 04 can be edited on the mobile terminal 01. To track changes in the original file 02, the corresponding file 04 includes the complete path (link 05) to the original file 02, i.e., the path to the user-specific storage location of the original file 02 on the provider server 03. The corresponding file 04 also includes a special value about the original file 02 so as to be able to verify if the original file 02 was changed in the interim. This value can be a hash value, a serial number or a timestamp.

In certain situations, the original file 02 itself must be processed on the mobile terminal 01. The original file 02 is then downloaded 11 from the server 03. The original file 02 is then available for processing on the mobile terminal 01 by an application 12 associated with the format of the original file 02 and can be modified. The processed original file 02 is then again be uploaded 16 to the server 03 where it can again be handled by the special application installed on the server 03, for example be forwarded as a fax 10.

The method of the invention is not only capable of processing original files 02 located outside the mobile terminal 01, but also files 15 stored locally on the mobile terminal 01. This is advantageous, for example, if there are no applications 12 associated with the files 15 installed on the mobile terminal 01. In this case, according to the invention, the files 15 are transferred 07 with a corresponding handling command from the mobile terminal 01 to the server 03 of the service provider, where the corresponding file 04 is generated and transmitted back 13 to the mobile terminal 01. Preferably, a preview of the original file 02 is included in the corresponding file 04 as HTML code.

According to another exemplary embodiment, at least a portion of the special applications 06 associated with the corresponding files 04 can be started from the standard programs—by clicking on the corresponding file 04. The user can then advantageously continue to use the already familiar standard programs, for example standard programs for administering files (e.g., Explorer) or for administering schedules (for example a scheduling calendar), for handling the files.

According to another exemplary embodiment of the method of the invention, original files 02 can be generated by using a "digital pen" (digitizing pen) and transferred to the mobile terminal 01. These files can then be transmitted to first or second data processing devices, for example a server 03, which are different from the mobile terminal 01, for example, for performing automatic text recognition. With text recognition, the image of the written text recorded, for example, with the digitizing pen (frequently as a bitmap file) is converted by a computer program into an editable file (for example, Word [*.doc] or text file [*.txt]).

According to another preferred embodiment, the contents of an original file 02 (located on the mobile terminal 01) or of a corresponding file 04 is directly inserted into an application resident on the mobile terminal 01, e.g., as a new e-mail, as a new calendar entry and the like, by starting the corresponding handling with the special application 06. An exemplary command may be "write new e-mail." In this case, a new e-mail message is automatically generated by the special application 06 via an interface of the e-mail client based on the content of the original file 02, or the original file 02 is transmitted first, i.e., before the e-mail is generated, by the special application 06 to the server 03, where the corresponding file 04 is generated (optionally after processing of the original file 02), and the corresponding file 04 is transmitted back to the mobile terminal 01, where the new e-mail is generated based on the content of the corresponding file 04. The second approach is advantageous, for example, when using the digitizing pen, because the digitizing pen typically generates a bitmap which frequently cannot be used directly. The server then performs, for example, text recognition and generates an editable file; the corresponding file 04 is then generated from this editable file and transmitted back to the mobile terminal 01 to enable further processing, for example insertion into a newly generated e-mail. Calendar entries can be automatically generated in the same manner, for example by transmitting the content of the application via an existing suitable interface. In addition to e-mails or calendar entries, these may also include task lists, notes, address entries. The process then appears to the user as if (s)he writes the e-mail text directly with the digitizing pen.

According to another preferred embodiment, handling of the original file 02 is determined already before or at the time the file is uploaded from the mobile terminal 01 to the first or second data processing device (server 03) which is different from the mobile terminal 01.

The embodiment of the invention on not limited to the aforedescribed preferred exemplary embodiment. A number of variations with quite different embodiments that utilize the device and the method according to the invention can be contemplated.

What is claimed is:
1. A method of handling a file with a mobile terminal, comprising the steps of:
 storing an original file to be handled on a first data processing device which is different from the mobile terminal,
 generating a corresponding file that corresponds to the original file and transmitting the corresponding file to the mobile terminal, wherein the corresponding file is a different file than the original file and includes at least information about a storage location of the original file,
 installing an application on the mobile terminal
 for capturing a command for handling the stored original file, wherein the command is entered on the mobile terminal by user input, and
 for prompting the first data processing device or a second data processing device which is also different from the mobile terminal to execute handling of the stored original file according to the user input, where the handling of the stored original file comprises at least one of:
  outputting at least a part of the original file on a device different than the mobile terminal,
  forwarding at least a part of the original file, and storing at least a part of the original file at a storage location on a device different from the mobile terminal, without having downloaded the original file to the mobile terminal prior to the handling.

2. The method of claim 1, comprising the step of transmitting the corresponding file from the first or second data processing device to the mobile terminal by using a telecommunication service or by using a TCP/IP, HTTP, HTTPS, FTP, SFTP, Telnet or SSH connection.

3. The method of claim 2, wherein the telecommunication service is implemented as a Short Message Service (SMS), an Enhanced Messaging System (EMS), or a Multimedia Messaging Service (MMS), or a combination thereof.

4. The method of claim 2, comprising the steps of:
transmitting the original file from a terminal to a server of a provider of an e-mail or telecommunication service as e-mail, SMS, EMS or MMS attachment,
replacing the original file with the corresponding file, and
transmitting the corresponding file as e-mail, SMS, EMS, or MMS attachment instead of the original file to the mobile terminal.

5. The method of claim 1, wherein the original file is transmitted from a server of a provider of an e-mail or telecommunication service to the first data processing device.

6. The method of claim 1, wherein the first data processing device functions with respect to the mobile terminal as a server of a provider of an e-mail or telecommunication service, wherein a computer program installed on the first data processing device:
queries the server of the provider of the e-mail or telecommunication service for e-mails or messages resident on the server,
receives the existing e-mails or messages,
replacing the original file with the corresponding file, and
makes the corresponding file available on the mobile terminal.

7. The method of claim 1, further comprising the steps of:
transmitting the original file from the mobile terminal to the first or second data processing device,
generating the corresponding file on the first or second data processing device, and
transmitting the corresponding file to the mobile terminal.

8. The method of claim 1, wherein the original file is generated with the help of a Digital Pen (digitizing pen) and subsequently transmitted to the mobile terminal.

9. The method of claim 7, wherein transmission of the original file to the first or second data processing device is controlled by the application installed on the mobile terminal.

10. The method of claim 7, wherein type of handling is determined before or at a time of transmission of the original file from the mobile terminal to the first or second data processing device.

11. The method of claim 1, wherein handling of the original file further includes at least one of
providing a visual output of the original file on the mobile terminal,
forwarding the original file as e-mail, fax, SMS, MMS,
language translation of the original file,
text recognition and conversion to a text document,
evaluation of a document generated with a digitizing pen and subsequently summarizing information of the document, and
evaluation of a document generated with a digitizing pen and subsequently automatically starting additional processes.

12. The method of claim 1, further comprising providing a results log of the handling to the mobile terminal and directly inserting content of the corresponding file or of the results log in an application residing on the mobile terminal.

13. The method of claim 1, wherein handling of the original file includes storing content of the original file on the mobile terminal in a file having a file type that corresponds to a file type of the original file.

14. The method of claim 1, wherein the application installed on the mobile terminal is started by calling the corresponding file via a link.

15. The method of claim 1, wherein the corresponding file is called from a mail application, a calendar application, or a file directory application.

16. The method of claim 1, wherein generating the corresponding file includes a format conversion to a format suitable for output or processing on the mobile terminal.

17. The method of claim 1, wherein the corresponding file includes data capable of reproducing original content of the original file on the mobile terminal, with the reproduced content being identical or substantially identical to the original.

18. The method of claim 17, further comprising the steps of:
modifying the corresponding file with the data capable of reproducing the content of the original file on the mobile terminal, transmitting the modified file to the first or second data processing device, and
changing the original file in accordance with the modifications carried out on the mobile terminal.

19. The method of claim 1, wherein modifications in the original file or in the corresponding file can be determined by determining a particular value.

20. The method of claim 19, wherein the particular value comprises a hash value, a serial number, or a time stamp.

21. The method of claim 1, wherein the corresponding file has a smaller file size than the original file or has a format optimized for the mobile terminal.

22. The method of claim 1, wherein the original file and the corresponding file are transmitted to the mobile terminal over a wireless link.

23. A system with at least a chip or processor configured to handle a file with a mobile terminal by:
storing an original file to be handled on a first data processing device which is different from the mobile terminal,
generating a corresponding file that corresponds to the original file and transmitting the corresponding file to the mobile terminal, wherein the corresponding file is a different file than the original file and includes at least information about a storage location of the original file,
installing an application on the mobile terminal
for capturing a command for handling the stored original file, and
for prompting the first data processing device or a second data processing device which is also different from the mobile terminal to execute handling of the stored original file according to the user input, where the handling of the stored original file comprises at least one of:
outputting at least a part of the original file on a device different from the mobile terminal,
forwarding at least a part of the original file, and
storing at least a part of the original file at a storage location on a device different from the mobile terminal,
without having downloaded the original file to the mobile terminal prior to the handling.

24. A computer program embodied in a client-side program module for a mobile terminal and a server-side program module for a data processing device, which after the client-side program module is loaded into memory of the mobile terminal and the server-side program module is loaded into a memory of the data processing device, enables the data processing device in cooperation with a mobile terminal to execute a method for handling data with the mobile terminal, the method comprising the steps of
- storing an original file to be handled on a first data processing device which is different from the mobile terminal,
- generating a corresponding file that corresponds to the original file and transmitting the corresponding file to the mobile terminal, wherein the corresponding file is a different file than the original file and includes at least information about a storage location of the original file,
- installing an application on the mobile terminal
- for capturing a command for handling the stored original file, wherein the command is entered on the mobile terminal by user input, and
- for prompting the first data processing device or a second data processing device which is also different from the mobile terminal to execute handling of the stored original file according to the user input, where the handling of the stored original file comprises at least one of:
   - outputting at least a part of the original file on a device different from the mobile terminal,
   - forwarding at least a part of the original file, and
   - storing at least a part of the original file at a storage location on a device different from the mobile terminal,
- without having downloaded the original file to the mobile terminal prior to the handling.

25. A non-transitory computer-readable storage medium storing a computer program, wherein the computer program comprises client-side and server-side program modules and the computer program enables a data processing device in cooperation with a mobile terminal, after the client-side program module is loaded into memory of the mobile terminal and the server-side program module is loaded into the memory of the data processing device, to execute a method for handling data with the mobile terminal, the method comprising the steps of:
- storing an original file to be handled on a first data processing device which is different from the mobile terminal,
- generating a corresponding file that corresponds to the original file and transmitting the corresponding file to the mobile terminal, wherein the corresponding file is a different file than the original file and includes at least information about a storage location of the original file,
- installing an application on the mobile terminal
- for capturing a command for handling the stored original file, wherein the command is entered on the mobile terminal by user input, and
- for prompting the first data processing device or a second data processing device which is also different from the mobile terminal to execute handling of the stored original file according to the user input, where the handling of the stored original file comprises at least one of:
   - outputting at least a part of the original file on a device different from the mobile terminal,
   - forwarding at least a part of the original file, and
   - storing at least a part of the original file at a storage location on a device different from the mobile terminal,
- without having downloaded the original file to the mobile terminal prior to the handling.

26. The computer program of claim 24, wherein the program is downloaded from a data network.

27. The computer program of claim 26, wherein the data network comprises the Internet.

28. The method of claim 1, where outputting comprises at least:
- printing, and
- faxing.

29. A method of handling files with mobile terminals, comprising the steps of:
- storing an original file to be handled on a first data processing device which is different from the mobile terminal,
- generating a corresponding file that corresponds to the original file and transmitting the corresponding file to the mobile terminal, wherein the corresponding file is a different file than the original file and includes at least information about a storage location of the original file,
- installing an application on the mobile terminal
- for capturing a command for handling the stored original file, wherein the command is entered on the mobile terminal by user input, and
- for prompting the first data processing device or a second data processing device which is also different from the mobile terminal to execute handling of the stored original file according to the user input, where the handling of the stored original file comprises at least one of:
   - printing,
   - faxing,
   - language translation of the original file,
   - text recognition and conversion to a text document,
   - evaluation of a document generated with a digitizing pen and subsequently summarizing information of the document, and
   - evaluation of a document generated with a digitizing pen and subsequently automatically starting additional processes,
- without having downloaded the original file to the mobile terminal prior to the handling.

30. The method of claim 29, comprising the step of transmitting the corresponding file from the first or second data processing device to the mobile terminal by using a telecommunication service or by using a TCP/IP, HTTP, HTTPS, FTP, SFTP, Telnet or SSH connection.

31. The method of claim 30, wherein the telecommunication service is implemented as a Short Message Service (SMS), an Enhanced Messaging System (EMS), or a Multimedia Messaging Service (MMS), or a combination thereof.

32. The method of claim 30, comprising the steps of:
- transmitting the original file from a terminal to a server of a provider of an e-mail or telecommunication service as e-mail, SMS, EMS or MMS attachment,
- replacing the original file with the corresponding file, and transmitting the corresponding file as e-mail, SMS, EMS, or MMS attachment instead of the original file to the mobile terminal.

33. The method of claim 29, wherein the original file is transmitted from a server of a provider of an e-mail or telecommunication service to the first data processing device.

34. The method of claim 29, wherein the first data processing device functions with respect to the mobile terminal as a server of a provider of an e-mail or telecommunication service, wherein a computer program installed on the first data processing device:
- queries the server of the provider of the e-mail or telecommunication service for e-mails or messages resident on the server,
- receives the existing e-mails or messages, replacing the original file with the corresponding file, and makes the corresponding file available on the mobile terminal.

35. The method of claim 29, further comprising the steps of:
transmitting the original file from the mobile terminal to the first or second data processing device,
generating the corresponding file on the first or second data processing device, and
transmitting the corresponding file to the mobile terminal.

36. The method of claim 29, wherein the original file is generated with the help of a Digital Pen (digitizing pen) and subsequently transmitted to the mobile terminal.

37. The method of claim 35, wherein transmission of the original file to the first or second data processing device is controlled by the application installed on the mobile terminal.

38. The method of claim 35, wherein type of handling is determined before or at a time of transmission of the original file from the mobile terminal to the first or second data processing device.

39. The method of claim 29, wherein handling further includes at least one of
providing a visual output of the original file on the mobile terminal,
forwarding the original file as e-mail, fax, SMS, MMS, and storing the original file on a server.

40. The method of claim 29, further comprising providing a results log of the handling to the mobile terminal and directly inserting content of the corresponding file or of the results log in an application residing on the mobile terminal.

41. The method of claim 29, wherein handling includes storing content of the original file on the mobile terminal in a file having a file type that corresponds to a file type of the original file.

42. The method of claim 29, wherein the application installed on the mobile terminal is started by calling the corresponding file via a link.

43. The method of claim 29, wherein the corresponding file is called from a mail application, a calendar application, or a file directory application.

44. The method of claim 29, wherein generating the corresponding file includes a format conversion to a format suitable for output or processing on the mobile terminal.

45. The method of claim 29, wherein the corresponding file includes data capable of reproducing content of the original file on the mobile terminal, with the reproduced content being identical to the original.

46. The method of claim 45, further comprising the steps of:
modifying the corresponding file with the data capable of reproducing the content of the original file on the mobile terminal, transmitting the modified file to the first or second data processing device, and
changing the original file in accordance with the modifications carried out on the mobile terminal.

47. The method of claim 29, wherein modifications in the original file or in the corresponding file can be determined by determining a particular value.

48. The method of claim 47, wherein the particular value comprises a hash value, a serial number, or a time stamp.

49. The method of claim 29, wherein the corresponding file has a smaller file size than the original file or has a format optimized for the mobile terminal.

50. The method of claim 29, wherein the original file and the corresponding file are transmitted to the mobile terminal over a wireless link.

51. A system with at least a chip or processor configured to handle files with mobile terminals by:
storing an original file to be handled on a first data processing device which is different from the mobile terminal,
generating a corresponding file that corresponds to the original file and transmitting the corresponding file to the mobile terminal, wherein the corresponding file is a different file than the original file and includes at least information about a storage location of the original file,
installing an application on the mobile terminal
for capturing a command for handling the stored original file, wherein the command is entered on the mobile terminal by user input, and
for prompting the first data processing device or a second data processing device which is also different from the mobile terminal to execute handling of the stored original file according to the user input, where the handling of the stored original file comprises at least one of:
printing,
faxing,
language translation of the original file,
text recognition and conversion to a text document,
evaluation of a document generated with a digitizing pen and subsequently summarizing information of the document, and
evaluation of a document generated with a digitizing pen and subsequently automatically starting additional processes,
without having downloaded the original file to the mobile terminal prior to the handling.

52. A non-transitory computer program embodied in a client-side program module for a mobile terminal and a server-side program module for a data processing device, which after the client-side program module is loaded into memory of the mobile terminal and the server-side program module is loaded into a memory of the data processing device, enables the data processing device in cooperation with a mobile terminal to execute a method for handling data with the mobile terminal, the method comprising the steps of
storing an original file to be handled on a first data processing device which is different from the mobile terminal,
generating a corresponding file that corresponds to the original file and transmitting the corresponding file to the mobile terminal, wherein the corresponding file is a different file than the original file and includes at least information about a storage location of the original file,
installing an application on the mobile terminal
for capturing a command for handling the stored original file, wherein the command is entered on the mobile terminal by user input, and
for prompting the first data processing device or a second data processing device which is also different from the mobile terminal to execute handling of the stored original file according to the user input, where the handling of the stored original file comprises at least one of:
printing,
faxing,
language translation of the original file,
text recognition and conversion to a text document,
evaluation of a document generated with a digitizing pen and subsequently summarizing information of the document, and
evaluation of a document generated with a digitizing pen and subsequently automatically starting additional processes, without having downloaded the original file to the mobile terminal prior to the handling.

53. The computer program of claim 52, wherein the program is downloaded from a data network.

54. The computer program of claim 52, wherein the data network comprises the Internet.

55. A non-transitory computer-readable storage medium storing a computer program, wherein the computer program comprises client-side and server-side program modules and the computer program enables a data processing device in cooperation with a mobile terminal, after the client-side program module is loaded into memory of the mobile terminal and the server-side program module is loaded into the memory of the data processing device, to execute a method for handling data with the mobile terminal, the method comprising the steps of:
storing an original file to be handled on a first data processing device which is different from the mobile terminal,
generating a corresponding file that corresponds to the original file and transmitting the corresponding file to the mobile terminal, wherein the corresponding file is a different file than the original file and includes at least information about a storage location of the original file,
installing an application on the mobile terminal
for capturing a command for handling the stored original file, wherein the command is entered on the mobile terminal by user input, and
for prompting the first data processing device or a second data processing device which is also different from the mobile terminal to execute handling of the stored original file according to the user input, where the handling of the stored original file comprises at least one of:
printing,
faxing,
language translation of the original file,
text recognition and conversion to a text document,
evaluation of a document generated with a digitizing pen and subsequently summarizing information of the document, and
evaluation of a document generated with a digitizing pen and subsequently automatically starting additional processes,
without having downloaded the original file to the mobile terminal prior to the handling.

56. A method of handling files with mobile terminal, comprising the steps of:
receiving an original file on a data processing device which is different from the mobile terminal, the original file being transmitted to the data processing device as an attachment of an e-mail, of a message of a short message service, of a message of an enhanced message service or of a message of a multimedia message service,
storing the original file to be handled on the data processing device,
generating a corresponding file that corresponds to the original file, wherein the corresponding file is a different file than the original file and comprises data for generating a reproduction of the content of the original file on the mobile terminal that corresponds to the content of the original file, and transmitting the corresponding file to the mobile terminal,
modifying the corresponding file on the mobile terminal to generate a modified file, transmitting the modified file to the data processing device, and
changing the original file in accordance with modifications of the modified file that were carried out on the mobile terminal,
wherein the data processing device functions with respect to the mobile terminal as a server of a provider of an e-mail or telecommunication service, wherein a computer program installed on the data processing device:
queries the server of the provider of the e-mail or telecommunication service for e-mails or messages resident on the server,
receives the existing e-mails or messages,
replaces the original file with the corresponding file, and
makes the corresponding file available on the mobile terminal.

57. The method of claim 56, wherein generating the corresponding file includes a format conversion to a format suitable for output or processing on the mobile terminal.

58. The method of claim 56, wherein the corresponding file includes data capable of reproducing content of the original file on the mobile terminal, with the reproduced content being identical to the original.

59. The method of claim 56, further comprising the steps of:
modifying the corresponding file with the data capable of reproducing the content of the original file on the mobile terminal, transmitting the modified file to the data processing device, and
changing the original file in accordance with the modifications carried out on the mobile terminal.

60. The method of claim 59, wherein modifications in the original file or in the corresponding file can be determined by determining a particular value.

61. The method of claim 60, wherein the particular value comprises a hash value, a serial number, or a time stamp.

62. The method of claim 56, comprising the step of transmitting the corresponding file from the data processing device to the mobile terminal by using a telecommunication service or by using a TCP/IP, HTTP, HTTPS, FTP, SFTP, Telnet or SSH connection.

63. The method of claim 62, wherein the telecommunication service is implemented as a Short Message Service (SMS), an Enhanced Messaging System (EMS), or a Multimedia Messaging Service (MMS), or a combination thereof.

64. The method of claim 62, comprising the steps of:
transmitting the original file from a terminal to a server of a provider of an e-mail or telecommunication service as e-mail, SMS, EMS or MMS attachment,
replacing the original file with the corresponding file, and
transmitting the corresponding file as e-mail, SMS, EMS, or MMS attachment instead of the original file to the mobile terminal.

65. The method of claim 56, wherein the original file is transmitted from a server of a provider of an e-mail or telecommunication service to the data processing device.

66. The method of claim 56, wherein the original file is generated with the help of a Digital Pen (digitizing pen) and subsequently transmitted to the mobile terminal.

67. The method of claim 56, wherein transmission of the original file to the data processing device is controlled by the application installed on the mobile terminal.

68. The method of claim 55, wherein type of handling is determined before or at a time of transmission of the original file from the mobile terminal to the data processing device.

69. The method of claim 55, wherein handling includes at least one of
outputting at least a part of the file,
forwarding at least a part of the file and storing at least a part of the file.
providing a visual output of the original file on the mobile terminal,
forwarding the original file as e-mail, fax, SMS, MMS,
storing the original file on a server,
language translation of the original file,
text recognition and conversion to a text document,
evaluation of a document generated with a digitizing pen and subsequently summarizing information of the document, and
evaluation of a document generated with a digitizing pen, and subsequently automatically starting additional processes.

70. The method of claim 55, further comprising providing a results log of the handling to the mobile terminal and directly inserting content of the corresponding file or of the results log in an application residing on the mobile terminal.

71. The method of claim 55, wherein handling includes storing content of the original file on the mobile terminal in a file having a file type that corresponds to a file type of the original file.

72. The method of claim 55, wherein the application installed on the mobile terminal is started by calling the corresponding file via a link.

73. The method of claim 56, wherein the corresponding file is called from a mail application, a calendar application, or a file directory application.

74. The method of claim 56, wherein the corresponding file has a smaller file size than the original file or has a format optimized for the mobile terminal.

75. The method of claim 56, wherein the original file and the corresponding file are transmitted to the mobile terminal over a wireless link.

76. A system with at least a chip or processor configured to handle files with mobile terminal by:
    receiving an original file on a data processing device which is different from the mobile terminal, the original file being transmitted to the data processing device as an attachment of an e-mail, of a message of a short message service, of a message of an enhanced message service or a message of a multimedia message service,
    storing the original file to be handled on the data processing device,
    generating a corresponding file that corresponds to the original file, wherein the corresponding file is a different file than the original file and comprises data for generating a reproduction of the content of the original file on the mobile terminal that corresponds to the content of the original file, and transmitting the corresponding file to the mobile terminal,
    modifying the corresponding file on the mobile terminal to generate a modified file, transmitting the modified file to the data processing device, and
    changing the original file in accordance with the modifications carried out on the mobile terminal,
    wherein the data processing device functions with respect to the mobile terminal as a server of a provider of an e-mail or telecommunication service, wherein a computer program installed on the data processing device:
        queries the server of the provider of the e-mail or telecommunication service for e-mails or messages resident on the server,
        receives the existing e-mails or messages,
        replacing the original file with the corresponding file, and
        makes the corresponding file available on the mobile terminal.

77. A non-transitory computer program embodied in a client-side program module for a mobile terminal and a server-side program module for a data processing device, which after the client-side program module is loaded into memory of the mobile terminal and the server-side program module is loaded into a memory of the data processing device, enables the data processing device in cooperation with a mobile terminal to execute a method for handling data with the mobile terminal, the method comprising the steps of
    receiving an original file on a data processing device which is different from the mobile terminal, the original file being transmitted to the data processing device as an attachment of an e-mail, of a message of a short message service, of a message of an enhanced message service or of a message of a multimedia message service,
    storing the original file to be handled on the data processing device,
    generating a corresponding file that corresponds to the original file, wherein the corresponding file is a different file than the original file and comprises data for generating a reproduction of the content of the original file on the mobile terminal that corresponds to the content of the original file, and transmitting the corresponding file to the mobile terminal,
    modifying the corresponding file on the mobile terminal to generate a modified file, transmitting the modified file to the data processing device, and
    changing the original file in accordance with the modifications carried out on the mobile terminal,
    wherein the data processing device functions with respect to the mobile terminal as a server of a provider of an e-mail or telecommunication service, wherein a computer program installed on the data processing device:
        queries the server of the provider of the e-mail or telecommunication service for e-mails or messages resident on the server,
        receives the existing e-mails or messages,
        replacing the original file with the corresponding file, and
        makes the corresponding file available on the mobile terminal.

78. The computer program of claim 77, wherein the program is downloaded from a data network.

79. The computer program of claim 77, wherein the data network comprises the Internet.

80. A non-transitory computer-readable storage medium storing a computer program, wherein the computer program comprises client-side and server-side program modules and the computer program enables a data processing device in cooperation with a mobile terminal, after the client-side program module is loaded into memory of the mobile terminal and the server-side program module is loaded into the memory of the data processing device, to execute a method for handling data with the mobile terminal, the method comprising the steps of: receiving an original file on a data processing device which is different from the mobile terminal, the original file being transmitted to the data processing device as an attachment of an e-mail, of a message of a short message service, of a message of an enhanced message service or of a message of a multimedia message service,
    storing the original file to be handled on the data processing device which is different from the mobile terminal,
    generating a corresponding file that corresponds to the original file, wherein the corresponding file is a different file than the original file and comprises data for generating a reproduction of the content of the original file on the mobile terminal that corresponds to the content of the original file, and transmitting the corresponding file to the mobile terminal, modifying the corresponding file on the mobile terminal to generate a modified file, transmitting the modified file to the data processing device, and wherein the first data processing device functions with respect to the mobile terminal as a server of a provider of an e-mail or telecommunication service, wherein a computer program installed on the data processing device:
queries the server of the provider of the e-mail or telecommunication service for e-mails or messages resident on the server,
receives the existing e-mails or messages,
replacing the original file with the corresponding file, and
makes the corresponding file available on the mobile terminal.

* * * * *